March 6, 1945.  A. SERNA  2,370,882
MICROMATIC ADJUSTMENT FOR WORK TABLES
Filed Feb. 18, 1943
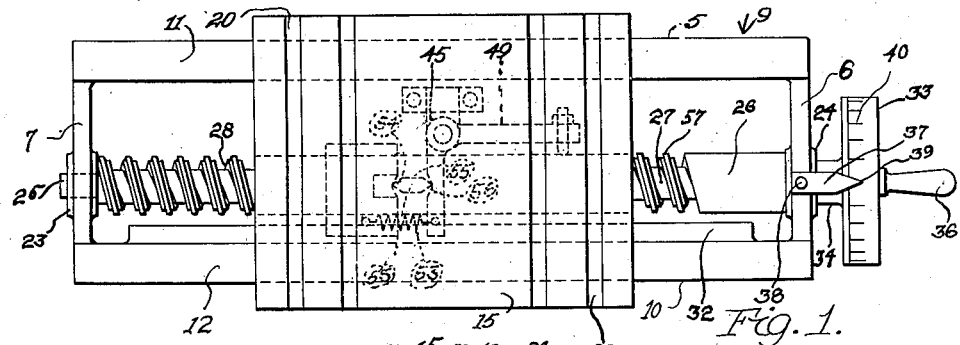
Fig. 1.
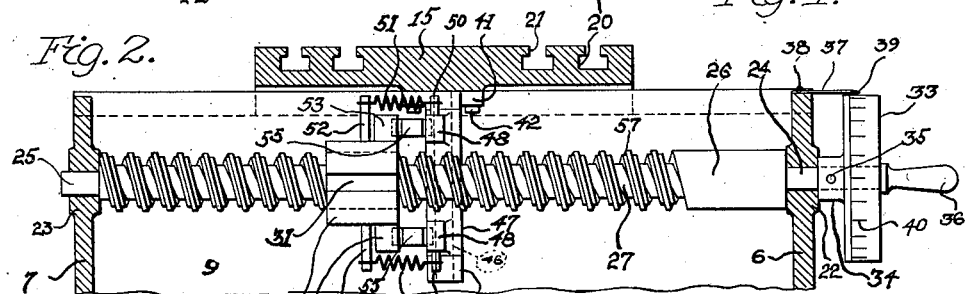
Fig. 2.
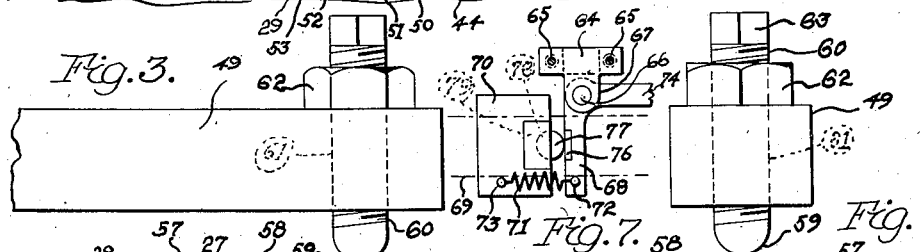
Fig. 3. Fig. 7. Fig. 4.
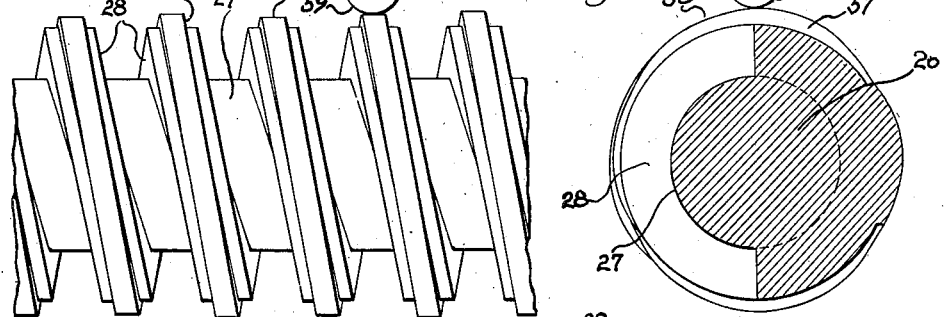
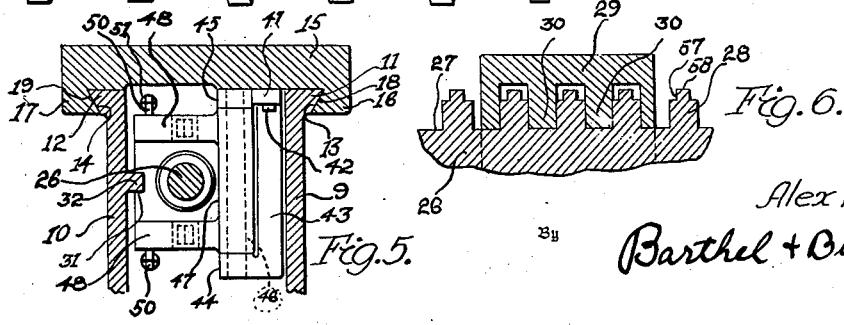
Fig. 5. Fig. 6.
Inventor
Alex Serna
By Barthel + Bugbee
Attorneys Patented Mar. 6, 1945

2,370,882

UNITED STATES PATENT OFFICE 2,370,882

MICROMATIC ADJUSTMENT FOR WORKTABLES

Alex Serna, Dearborn, Mich.

Application February 18, 1943, Serial No. 476,267

14 Claims. (Cl. 90—58)

The present invention relates to machine tools and more particularly, to an adjustable work bed therefor.

The primary object of the invention is to provide a traversing feed screw for a work-supporting bed adapted to be used with precision machine tools and to provide means for compensating for inaccuracies in the feed screw so that a predetermined movement of the feed screw as registered on a gauge or indicator thereon will produce a corresponding absolute linear movement of the work table or bed.

Another object of the invention is to provide a feed screw for work beds or tables having a compensating thread which is engaged by a probe arm to correct inaccuracies in the screw and to facilitate the movement of the table or work bed a predetermined distance in accordance with the distance registered on the feed screw indicator.

Another object of the invention is to provide a device as set forth in the above mentioned objects which may be used in the formation of master screws as well as being employed as a work bed or table feed screw whereby master screws of absolute accuracy may be produced inexpensively and in a short period of time.

Another object of the invention is to provide a feed screw for a work table or the like having a compensating thread in addition to the feed thread, portions of which may be removed as desired by filing or cutting away the outer surface of the thread so that inaccuracies in the feed thread resulting from wear may be corrected during time intervals of machine use, thereby eliminating the necessity of removing the master feed screw and replacing the same without requiring cessation of machine operations over great lengths of time. The configured compensating thread can be built up by welding or plating in event excessive material is accidentally removed therefrom.

Other objects and advantages of the invention will become apparent during the course of the following description of the accompanying drawing, wherein Figure 1 is a top plan view of the device embodying the invention illustrating the application thereof to a linearly movable work bed;

Figure 2 is a longitudinal cross-sectional view of the device shown in Figure 1 illustrating various parts in detail;

Figure 3 is a fragmentary side elevational view of the feed screw and compensating thread illustrating the manner in which the probe arm is presented thereto;

Figure 4 is a vertical cross sectional view taken on Fig. 3 illustrating the manner in which the compensating thread may be preformed by removing portions thereof to impart accurate movement to the work table or bed;

Figure 5 is a vertical cross sectional view further illustrating in detail various structural elements interconnecting the screw and work bed;

Figure 6 is a longitudinal cross sectional view of the thread receiving traversing nut; and Figure 7 is a fragmentary elevational view of a modified form of the invention illustrating a different type of fulcrum connection between the traversing nut and work bed or table.

In the drawing wherein for the purpose of illustrating the invention and wherein like reference characters will be employed to designate like parts of the same, the reference character 5 will generally be employed to designate a work bed guide including end frame members 6 and 7 connected by side walls 9 and 10 having guide ways 11 and 12 respectively formed on the upper edges thereof and integrally connected with the end walls 6 and 7. The above construction may comprise a machine frame for a vertical precision boring machine or other machine tool and may be capable of vertical adjustment to position work supported thereby relative to the machine tool. The ways 11 and 12 are provided with bevelled edges as at 13 and 14 respectively and are adapted to slidably receive a linearly movable work table 15 having marginal depending ribs 16 and 17 provided with undercut bevelled walls 18 and 19 for slidably engaging the bevelled edges 13 and 14 of the ways 11 and 12. The top surface of the work bed or table 15 is provided with transversely extending slots 20 having reduced portions 21 to facilitate the reception of bolts or the like which may be used for bolting the work securely in place upon the face of the work bed or table 15.

Formed in the end walls 6 and 7 are bearing bosses 22 and 23 for receiving bearing portions 24 and 25 of a feed screw generally indicated by the reference character 26. The bearing portions 24 and 25 are reduced in diameter and are snugly fitted to eliminate as much as possible endwise motion or play between the bearing bosses 22 and 23 with respect to the screw 26. The feed screw 26 is provided with the usual spiral land 27 for forming screw threads 28 of usual configuration and said screw threads 28 are adapted to receive a traversing nut 29 having a spirally formed thread 30 adapted to extend between the vertical walls of the spiral thread 28. The traversing nut 29 is provided along one wall with a groove 31 for receiving a longitudinal rib 32 formed on the inner wall of the side frame member 10 to prevent rotation of said traversing nut and to cause said nut to be fed along said screw 26 upon rotation thereof. One end of the feed screw 26 is provided with a gauge wheel 33 the hub of which as at 34 is keyed or otherwise secured in place by means of a locking pin 35. A crank handle 36 projects outwardly from the wall of the drum 33 so that the feed screw 26 may be manually rotated and the end wall 16 of the machine frame is provided with a pointer 37 fastened in place as at 38 so that the free pointed end 39 may register with graduations 40 marked or otherwise impressed on the peripheral surface of the graduated wheel 33.

Fastened to the under side of the linearly movable work table 15 is a bracket plate 41 secured in position by bolts or the like as at 42. A bracket arm 43 depends from the bracket plate 41 and is provided at its lower end with a bearing boss 44 in registry with the bearing boss 45 formed integral with the bracket plate 41. Secured between the bearing bosses 44 and 45 is a hinge pintle 46 upon which is swingingly mounted a tubular sleeve 47 having a pair of parallel extending arms 48 formed integral therewith and an arm 49 intermediate the ends of the sleeve 47 likewise formed integral therewith and extending at right angles to the spaced parallel arms 48. The free ends of the arms 48 are provided with pins 50 over which is hooked one end of a pair of coil springs 51. The opposite ends of the coil springs are hooked over pins 52 extending from opposite sides of the traversing nut 29 whereby said arms will be urged toward said nut. Also formed on the traversing screw 29 is a pair of oppositely extending projections 53 having notches 54 cut inwardly thereof for receiving a fulcrum block 55 having one of its knife edges fulcrumed in said notch 54 and its other knife edge fulcrumed in a notch 56 formed intermediate the length of the arm 48. Said fulcrum blocks 55 are prevented from being displaced by being urged into engagement with the arm 48 and projections 53 by means of the tension created by the springs 51 so that the work table 15 will follow the traversing nut 29. The coil springs 51 will be of such a size and shape as to provide sufficient tension to maintain the fulcrum blocks 55 in operative relation with the projections 48 and 53. As long as the fulcrum blocks are thus tightly held in place, the arm 49 of the bell lever will be held in contact with the profile thread 58.

Formed on the outer wall of the spiral feed thread 28 is a compensating thread 57 the peripheral portion of which as at 58 is adapted to be trimmed or filed as shown in Fig. 4 to provide a spiral profile guide to which is presented the curved end 59 of a probing pin 60 mounted in an opening 61 in the free swinging end of the fulcrum lever 49. The probing pin 60 is suitably threaded and is provided with a lock nut 62 to lock the same in a desired adjusted position and the upper end 63 of the probe pin is polygonally shaped to facilitate the reception of a wrench or the like while making adjustments. By filing or cutting away the peripheral wall surface 58 a predetermined amount at desired locations, the fulcrum arm 49 may be swung on its hinge pin 46 to move the work table or bed 15 backward or forward with respect to the traversing nut 29 so that for every fractional movement or rotation of the graduated drum 33 there will be an absolute movement of the work bed 15 along the entire length of the feed screw 26. Should the threads of the traversing nut 29 and the threads 28 of the feed screw 26 become worn, portions of the spiral compensating thread 57 may be removed to compensate for the wear therebetween.

In the modified form of the invention shown in Figure 7, the bracket plate 64 may be bolted by means of bolts or the like 65 to the under side of the work table or other linearly movable support 15 as shown in Figs. 1 and 2 and said bracket plate 64 may support a hinge pintle 66 between suitable spaced bearing lugs as at 67. Rockably mounted on the hinge pin 66 is a sleeve similar to the sleeve 47 shown in Figs. 1 to 6 inclusive and said sleeve is provided with spaced parallel arms 68 arranged as similar to the arms 48. A feed screw 69 is provided with a traversing nut 70 and the arms 68 are urged toward the traversing nut 70 by means of coil springs or the like 71 fastened over pins 72 and 73 on the arms 68 and traversing screw 70 respectively. The fulcrum arm 74 is substantially identical to the arm 49 shown in Figs. 1 to 6 and has its free end similarly provided with a probe pin for engaging a compensating thread on the feed screw 69. Secured in suitable recesses intermediate the length of the spaced parallel arms 58 is a hardened bearing block 76 adapted to be engaged by a fulcrum roller 77 received in a circular cutaway portion 78 in a hardened wear block 79 mounted in the traversing nut 70. The operation of the fulcrum structure shown in Fig. 7 is substantially identical to the fulcrum structure shown in Figs. 1 to 6 inclusive and is illustrative of other means by which the invention may be carried out.

It is to be understood that the forms of the invention herewith shown and described are to be taken as preferred embodiments of the same and that changes in the shape, size and arrangement of parts may be resorted to without departing from the spirit of the invention or the scope of the subjoined claims.

What I claim is:

1. In combination, a movable support and a support moving member, an adjusting device pivoted to said support having an arm thereon, said adjusting device being adapted for variably connecting said movable support and moving member and profile means on the moving member engageable by said arm for varying the relative movement between the moving member and movable support throughout the length of travel of said movable support.

2. In combination, a work support and a feed screw having a profile surface for moving said support, an adjusting device pivoted to the underside of said support interconnecting said screw and support for relative movement therebetween and a probe arm on said adjusting device engaging said profile surface and controlled by the movement of the feed screw for moving the support relative to the feed screw whereby inaccuracies in said feed screw will be compensated for.

3. In combination, a movable work support and a feed screw therefor having a form surface, an adjusting device pivoted to said support having an arm thereon, said adjusting device being adapted for variably interconnecting said screw with the work support and a probe arm engaging the form surface and controlled by the feed screw for varying said interconnecting means to compensate for inaccuracies in said feed screw.

4. In combination, a work support and a feed screw for moving said support, an adjusting device pivoted to the work support for variably connecting said screw and support so as to permit movement of said work support a slight distance independently of the movement imparted to the work support by said screw and means carried by said adjusting device controlled by rotation of said feed screw for varying said connection a slight amount to thereby compensate for inaccuracies in the feed screw.

5. In combination, a movable support and a feed screw for moving said support linearly along said screw having a form surface thereon, an adjusting device carried by said movable support pivotally connecting said support with said feed screw and a member extending from said adjusting device engaging said form surface and controlled by the movement of said screw for rocking said pivotal adjusting device and causing a slight relative movement between said support and screw in both directions of support movement as said support is fed by said screw.

6. In combination, a work support and a feed screw for moving said support linearly along said support, said feed screw having a profile surface formed on the threads thereof, a bell crank lever carried by the work support, a non-rotatable nut on the feed screw, a pivotal connection between one arm of said bell crank lever and nut adjustably connecting said bell crank lever and said feed screw to permit a slight movement therebetween, and a probe member on said other arm of the bell crank lever engaging said profile surface to move said support relative to said nut a slight distance in either of its directions of movement and thereby compensate for inaccuracies in the thread pitch of said screw.

7. In combination, a linearly movable work support and a feed screw therefor having a travelling nut thereon, a bell crank lever pivoted to the work support having one end fulcrumed on the travelling nut and its opposite end presented to and controlled by said screw whereby rocking movement thereof will cause relative movement between the work support and screw.

8. In combination, a movable work support and a feed screw therefor having a compensating profile thread portion, a travelling nut on said feed screw, a pivotal connection between said nut and work support and means controlled by the profile thread for moving said support relative to said nut whereby said support will travel an equal linear distance corresponding to an equal distance of said feed screw.

9. In combination, a movable work support and a feed screw therefor having a profile compensating thread capable of being preshaped, a travelling nut mounted on said feed screw, a pivotal fulcrum member connecting said support and nut, and a probe arm carried by said pivotal fulcrum having one end engaging the profile thread for causing relative movement between the support and travelling nut to compensate for inaccuracies in the feed screw.

10. In combination, a linearly movable work support and a screw having feed threads and additional profile threads, a nut mounted on said screw threads, a pivotal connection between said nut and work support and a probe arm engaging said profile thread for shifting said support relative to said nut to compensate for inaccuracies in the feed screw threads.

11. In combination, a linearly movable work support and an actuator screw therefor having feed and profile threads, a travelling non-rotatable nut carried by the actuator screw operably engaging said feed threads, a fulcrum member pivotally connecting the nut with the work support and a probe arm carried by the fulcrum member having its end engaging the profile thread while said support will be moved relative to the nut during its movement along the feed threads to compensate for inaccuracies therein.

12. In combination, a movable work support and an actuator screw therefor having spiral feed and profile threads thereon, a travelling nut movable along said screw operably engaging said feed threads, a fulcrum member pivotally connecting the nut to the work support, a probe arm carried by said fulcrum member engaging the profile threads on said actuator screw whereby movement of said probe arm in response to the predetermined configuration of the profile threads will cause said support to be shifted relative to said nut and compensate for inaccuracies in the feed threads of said screw.

13. A device of the character described, comprising a movable work table, a screw having feed threads for moving said table, a nut adapted to travel on said feed thread, a profile thread on the feed thread, a fulcrum lever pivoted on the under side of the work table, resilient means for connecting said fulcrum lever to said nut and a probe arm carried by said fulcrum lever engaging said profile thread for rocking said lever and moving the work table relative to said nut.

14. A device of the character described, comprising a linearly movable work table, an actuator screw for moving the work table having feed and configured profile threads, a non-rotatable nut mounted on said screw operably engaging said feed threads, a bell crank lever pivotally mounted on said table, a coil spring connecting one of the arms of said bell crank lever with the nut, fulcrum blocks interposed between the nut and said bell crank arm and a probe carried by the other end of the bell crank lever adapted to engage the configured profile threads whereby inaccuracies in the feed thread may be compensated for.

ALEX SERNA.